United States Patent
Schmid (10) Patent No.: US 9,287,711 B2
(45) Date of Patent: Mar. 15, 2016

(54) REDUCING DEMAND/RESPONSE EFFECTS IMPLEMENTING VOLT/VAR CONTROL

(75) Inventor: James Joseph Schmid, Acworth, GA (US)

(73) Assignee: General Electric Company, Schenectady, NY (US)

(*) Notice: Subject to any disclaimer, the term of this patent is extended or adjusted under 35 U.S.C. 154(b) by 1204 days.

(21) Appl. No.: 13/108,162

(22) Filed: May 16, 2011

(65) Prior Publication Data

US 2012/0296491 A1 Nov. 22, 2012

(51) Int. Cl.
*G06F 1/28* (2006.01)
*H02J 3/18* (2006.01)
*H02J 3/16* (2006.01)
*H02J 13/00* (2006.01)

(52) U.S. Cl.
CPC ............ *H02J 3/1828* (2013.01); *H02J 3/16* (2013.01); *H02J 13/0062* (2013.01); *H02J 13/0079* (2013.01); *H02J 13/0086* (2013.01); *Y02E 40/34* (2013.01); *Y02E 40/74* (2013.01); *Y02E 60/726* (2013.01); *Y02E 60/7838* (2013.01); *Y04S 10/22* (2013.01); *Y04S 10/24* (2013.01); *Y04S 40/124* (2013.01)

(58) Field of Classification Search
CPC ... H02J 3/1807; H02J 3/1878; H02J 13/0079; H02J 2003/003; Y04S 10/54; Y04S 10/22; Y02E 40/30
USPC ......... 700/298, 292, 293, 294, 295, 296, 297; 307/31
See application file for complete search history.

(56) References Cited

U.S. PATENT DOCUMENTS

| 4,023,043 | A | * | 5/1977 | Stevenson | 307/38 |
| 4,804,938 | A | * | 2/1989 | Rouse et al. | 370/276 |
| 5,731,688 | A | * | 3/1998 | Thomson | 322/22 |
| 5,734,255 | A | * | 3/1998 | Thompson et al. | 322/7 |
| 5,754,033 | A | * | 5/1998 | Thomson | 322/45 |
| 5,973,481 | A | * | 10/1999 | Thompson et al. | 322/7 |
| 6,785,592 | B1 | * | 8/2004 | Smith et al. | 700/291 |
| 7,274,975 | B2 | * | 9/2007 | Miller | 700/295 |
| 8,577,510 | B2 | * | 11/2013 | Powell et al. | 700/295 |
| 2002/0198629 | A1 | * | 12/2002 | Ellis | 700/286 |
| 2003/0110066 | A1 | * | 6/2003 | Walser et al. | 705/7 |
| 2007/0112694 | A1 | * | 5/2007 | Metcalfe | 705/412 |
| 2008/0039979 | A1 | * | 2/2008 | Bridges et al. | 700/292 |

(Continued)

FOREIGN PATENT DOCUMENTS

CN 1364332 A 8/2002

OTHER PUBLICATIONS

U.S Department of Energy, DOE Benefits o Demand Response in Electricity Markets & Recommendations for Achieving Them Recomendations for Achiving Them, Feb. 2005, 72, 73, 77-97.*

(Continued)

*Primary Examiner* — Rexford Barnie
*Assistant Examiner* — Elim Ortiz
(74) *Attorney, Agent, or Firm* — Sutherland Asbill & Brennan LLP (57) ABSTRACT

A method for reducing the effects of a demand/response event in a power distribution network can include identifying a load profile in the power distribution network, in response to detecting a peak in the load profile, decreasing the voltage in the power distribution network and, in response to detecting a trough in the load profile, increasing the voltage in the power distribution network.

18 Claims, 4 Drawing Sheets

(56) References Cited

U.S. PATENT DOCUMENTS

| | | | |
|---|---|---|---|
| 2008/0040223 A1* | 2/2008 | Bridges et al. | 705/14 |
| 2008/0052145 A1* | 2/2008 | Kaplan et al. | 705/8 |
| 2008/0167756 A1* | 7/2008 | Golden et al. | 700/297 |
| 2008/0177678 A1* | 7/2008 | Di Martini et al. | 705/412 |
| 2009/0265042 A1* | 10/2009 | Mollenkopf et al. | 700/298 |
| 2009/0281885 A1* | 11/2009 | Castelli et al. | 705/14.13 |
| 2009/0295594 A1* | 12/2009 | Yoon | 340/825.36 |
| 2009/0326726 A1* | 12/2009 | Ippolito et al. | 700/291 |
| 2010/0179704 A1* | 7/2010 | Ozog | 700/291 |
| 2010/0244563 A1 | 9/2010 | Fleck | |
| 2010/0292856 A1* | 11/2010 | Fujita | 700/291 |

OTHER PUBLICATIONS

Chinese Patent Office Action for Application No. CN 201210251136.0 dated Apr. 3, 2015.

* cited by examiner

FIG. 2

REDUCING DEMAND/RESPONSE EFFECTS IMPLEMENTING VOLT/VAR CONTROL

BACKGROUND OF THE INVENTION

The subject matter disclosed herein relates to electric power systems and more particularly to reduction of demand/response effects implementing volt/VAR control systems and methods.

Reactive power occurs when apparatuses with inductance or capacitance return power to the power plant supplying the power to the apparatus. For example, an electrical appliance contains inductance and capacitance. During portions of the alternating current (AC) cycle, the appliance stores energy, and during other portions of the AC cycle, the appliance returns the energy. As such, electrical energy from the appliance periodically returns to the power plant, and the energy flows back and forth across the power lines. This phenomena leads to an extra current in the power lines, which can cause wasted energy in the form of heated power lines, as well as voltage drops in the power distribution circuits. "VAR" is volt-amperes-reactive and is the term used to describe reactive power. VAR support is implemented in order to manage the voltage drops in the power system. Demand/response events can cause significant increases in the overall load profile of the power distribution circuits before and after the demand/response event. These increases are called pre-rebounds and post-rebounds.

What is needed is VAR support that actively reduces the magnitude of the rebounds and provides some control over the magnitude of the rebounds.

BRIEF DESCRIPTION OF THE INVENTION

According to one aspect of the invention, a method for reducing effects of a demand/response event in a power distribution network is described. The method can include identifying a load profile in the power distribution network, in response to detecting a peak in the load profile, decreasing voltage in the power distribution network and in response to detecting a trough in the load profile, increasing the voltage in the power distribution network.

According to another aspect of the invention, a computer program product for reducing effects of a demand/response event in a power distribution network is described. The computer program product can include a non-transitory computer readable medium having instructions for causing a computer to implement a method. The method can include identifying a load profile in the power distribution network, in response to detecting a peak in the load profile, decreasing voltage in the power distribution network and in response to detecting a trough in the load profile, increasing the voltage in the power distribution network.

According to yet another aspect of the invention, a system for reducing effects of a demand/response event in a power distribution network is described. The system can include a demand response management system and a demand/response management system demand event dispatcher process residing on the demand/response management system, and configured for reducing voltage in the power distribution network at specified times and actively increasing the voltage in the network during additional specified times to reduce a load difference between peaks and troughs during the demand response event.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
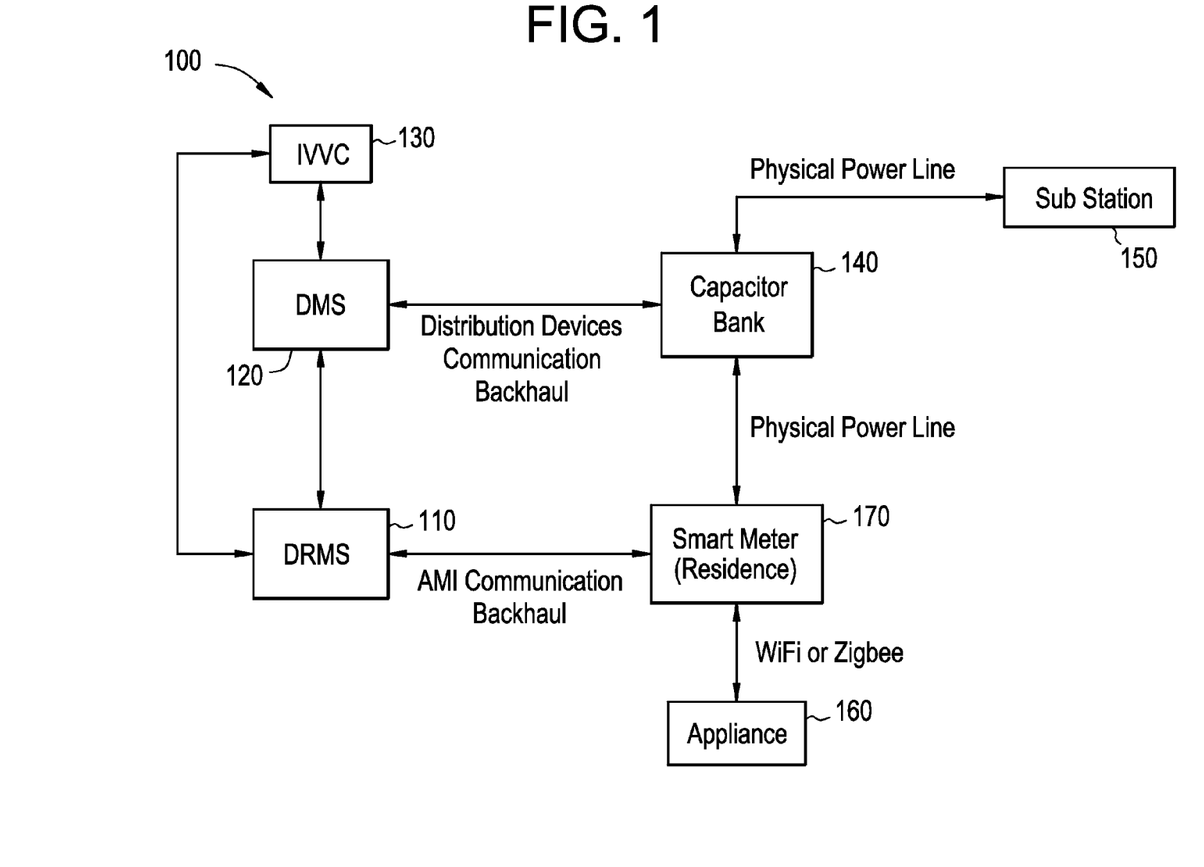
FIG. 1 illustrates a block diagram of an exemplary system for reducing demand/response event pre-rebounds and post-rebounds implementing volt/VAR support.

FIG. 1 illustrates an exemplary system 100 for reducing demand/response event pre-rebounds and post-rebounds implementing volt/VAR support. It will be appreciated that the system 100 is a part of a larger power distribution network controlled by a power utility. In exemplary embodiments, the system 100 can include a demand/response management system (DRMS) 110, which is a utility operational system responsible for creating and managing demand/response events that control end consumer electric power consumption. In exemplary embodiments, demand/response events can be controlled by directly controlling end consumer devices (i.e., direct load control), or by sending variable power rates to end consumer devices (i.e., pricing control) to shift consumer electric power consumption behavior. For example, pre-rebounds and post-rebounds can be controlled by anticipating a pre-rebound and informing a consumer that at a particular time of day, the power rate cost will increase. The power utility can therefore directly control a consumer's thermostat, for example, to pre-cool a house so that the thermostat can be set higher during the demand/response event. In this way, the thermostat can stay off during the higher cost pre-rebound event. During pre-rebound events, energy consumption by consumers tends to increase. During post-rebounds, energy consumption decreases significantly. As described further herein, the exemplary systems and methods work to maintain energy consumption at a particular level in order to maintain power levels in which voltage and current waves are aligned. As such, as described further herein, the DRMS 110 is communicatively coupled to a consumer smart meter 170, which can be via an Automated Metering Infrastructure (AMI) communication backhaul as known in the art. The DRMS 110 can therefore have direct control and access to the smart meter 170.

In exemplary embodiments, the system 100 can further include a distribution management system (DMS) 120, which can be operatively coupled to the DRMS 110. The DMS 120 is an electric power utility operational system responsible for collecting data from and controlling all electric power distribution devices (e.g., switches, voltage regulators, and capacitor banks) on the power distribution network. The DMS 120 actively manages distribution devices to increase efficiency and reliability in the power distribution network. The DMS 120 can implement various applications in order to increase reliability and efficiency including but not limited to: optimal feeder reconfiguration (OFR), fault detection, isolation and restoration (FDIR), and integrated volt/VAR control (IVVC) 130. OFR finds the best choice of open (tie) points in the power network for enhanced load balancing. In order to limit the number of customers affected by an interruption due to a fault, distribution feeders in the power network are broken up into sections isolated by motorized switches or breakers. FDIR detects which section of the feeder the fault occurred, and isolates that feeder section by operating the isolating switches or breakers and restoring power to the non-faulted sections. Thus, only those customers on the faulted section are affected by a power outage.

As described herein, inductive loads, such as air conditioners, furnaces, and dryers, can generate VARs. Since residential meters only measure watts, and since the power utility bills consumers for watts, a goal of the power utility is to reduce the number of VARs consumed. Meters can measure VARs. Power utilities often control capacitor banks, such as capacitor bank 140, and distribution substations, such as sub station 150, to compensate for VAR losses, particularly during demand/response events in which VAR support can be implemented. However, switching in the capacitor bank 140 due to high VAR consumption increases voltages, which may at times exceed mandated voltage limits. In exemplary embodiments, IVVC 130 maintains voltage levels and reduces VAR losses. In exemplary embodiments, the IVVC 130 is an application that can be maintained in the DMS 120, and provides coordinated control of the power network components such as the capacitor bank 140 and sub station 150 to seek a reduced VAR and voltage profile. As illustrated, the DMS 120 is also coupled to the capacitor bank 140 via a distribution devices communications backhaul, for example, as known in the art. The IVVC 130 continuously analyzes real time data and controls all of the power hardware in the system 100 such as the capacitor bank 140 and the sub station 150 (and other hardware not shown including but not limited to: load tap changers (LTCs) and voltage regulators) to manage system power factor and voltage. The IVVC 130 allows the power utility to flatten voltage profiles and to lower average voltages. It often results in significant energy savings while simultaneously maintaining a unity power factor to reduce or eliminate technical losses. In addition, the IVVC 130 enables conservation voltage reduction (CVR) in the system 100. CVR is a process by which the utility systematically reduces voltages in its distribution network, resulting in a proportional reduction of load on the network. The IVVC 130 improves system reliability, efficiency, and productivity by managing the voltage profile and power factor, reducing line losses, deferring the costs of new installations, and reducing equipment maintenance costs. The IVVC 130 also incorporates historical data that helps to determine the effect of each operation. The IVVC 130 includes engines to meet the power utility's desired power factor and voltage targets and resolve any conflicts between the two parameters. The application evaluates and controls LTC and regulator set points and tap positions, as well as capacitor bank states, in order to maintain target voltages in the distribution grid. The IVVC 130 also evaluates and controls capacitor bank states to manage feeder and substation VAR flows, which allows the utility to maintain a power factor as close to unity as possible.

As described herein, the system 100 can further include a consumer appliance 160 and the smart meter 170 communicatively coupled to the appliance 160. In exemplary embodiments, the appliance 160 can be coupled to the smart meter 170 via any suitable communications medium such as but not limited to a wireless WiFi connection. The smart meter 170 can be communicatively coupled to the DRMS 110 under a prior agreement as discussed herein. In this way, the DRMS 110 can manage the appliance 160 directly via the smart meter 170. For example, the appliance 160 can be an air conditioner, and the DRMS 110 can control the thermostat of the air conditioner directly turning the air conditioner on and off (i.e., power cycling the air conditioner) depending on the time of day and the demand that exists during the time of day in order to control reactive power in the system 100. In return, the consumer can receive an overall lower power rate. Only one appliance 160 and smart meter 170 are shown for illustrative purposes. It will be appreciated that the system 100 and the power network can include numerous appliances and smart meters. In addition, only one capacitor bank 140 and sub station 150 are shown. It will also be appreciated that various other capacitor banks, sub stations and other power components are included in the larger power distribution network. The capacitor banks, substations and other power components in the system and ultimately the consumer location can be coupled to one another by physical power lines as known in the art.

In exemplary embodiments, the DRMS 110 includes a record of all consumer induction devices, such as the appliance 160, in the power network that has been registered by the consumer. In exemplary embodiments, the power utility can make an estimation of the VARs that are generated when a device such as the appliance 160 is power cycled. In this way, the DRMS 110 can include a record of how much shift occurs between the voltage and current waves generated in the system 100. Conventionally, the DRMS 110 can implement the IVVC 130 to look at individual capacitor banks such as the capacitor bank 140 and power cycle the capacitor banks to provide VAR support in the system 100. As known in the art, power is a function of the product of voltage and current. Maximum power is generated when the voltage and current waves are in phase. By controlling the capacitor banks as described herein, the power utility can push the current wave back into phase with the voltage wave. In this way, the capacitor banks slow the current wave in the system 100 but maintain the voltage wave, thereby providing VAR support in the system 100. The voltage wave instead pushes back the current wave back to a position that helps to increase power in the systems. However, repeatedly power cycling the capacitor bank 140 in this manner can decrease the effective life of the capacitor bank.

As described herein, the system 100 includes numerous consumer appliances that are coupled to smart meters. As such the power utility has control access to the various appliances. In exemplary embodiments, since the appliances themselves generate reactive power in the system 100 as described herein, the power utility can modify the IVVC 130 in the system to manipulate the appliances in the system 100 to provide VAR support particularly during demand/response events in which there are pre-rebounds and post-rebounds. In exemplary embodiments, the DRMS 110 can (via the IVVC 130) calculate energy consumption during pre-rebounds and post-rebounds and reduce the effects of the pre-rebounds and post-rebounds to provide a smoother transition between pre-rebounds and post-rebounds during a demand/response event. By calculating the pre-rebound and post-rebound energy consumption, the IVVC 130 can be programmed to reduce pre-rebound consumption by a predetermined amount (e.g., 5% of the total pre-rebound magnitude previously calculated). Then, during the demand/response event, the total magnitude will be reduced as well. In this way, the change in energy consumption (e.g., the delta "Δ" of magnitude) that occurs during the pre-rebound and post-rebound times of a demand response event is reduced, thereby smoothing the transition as discussed herein. As described herein, the reactive energy of the system can shift the voltage and current waves, thus reducing overall power in the power distribution network. The reactive energy caused by the pre-rebound and post-rebound energy consumption increases this reactive power effect. In exemplary embodiments, the IVVC 130 can scan the power distribution network and adjust the power hardware such as the capacitor bank 140 and sub station 150 (and whatever other suitable hardware such as voltage feeders and regulators) to reduce power loss by aligning the voltage and current waves in the power distribution network. In exemplary embodiments, the IVVC 130 can also flatten the voltage wave to maintain the voltage within regulatory limits. In exemplary embodiments, the DRMS 110 can initiate voltage flattening prior to the demand/response event in order to lower the power threshold during the pre-rebounds and post rebounds. In this way, the overall power threshold during the event is lowered in the pre-rebound period and increased in the post-rebound period thereby reducing the overall Δ between the peak of the pre-rebound period and the trough of the post-rebound period.

In exemplary embodiments, the IVVC 130 will control capacitor banks and voltage regulators in a power distribution network. By using DRMS 110 to power cycle the appliances (such as the appliance 160), the power utility can simulate situations in which the power utility is power cycling the capacitor banks (such as the capacitor bank 140) in the system to provide VAR support. In this way, the system 100 can include "virtual capacitor banks" within the system 100 by coordinated power cycling of appliances in the system 100. As described herein, if the consumer is already on a plan in which the consumer agrees to have the power utility power cycle the consumer appliance(s), the power utility can plan and coordinate the agreed upon power cycling of the appliances as part of VAR support in the system 100.

As such, in response to a determination by the power utility that VAR support is required in the system 100, the power utility can initiate a coordinated power cycling of appliances (e.g., the appliance 160). During times when VAR support is desired or required in the system 100, the DRMS 110 is queried to provide the collection of inductive devices on the system. The devices are turned off to provide VAR support to the system 100 or turned on when VAR support is not required, which can help regulate the voltage in the power distribution network. By scheduling when inductive devices are power cycled, voltage drops in the system 100 can be managed in the way of VAR support.

Figure 2:
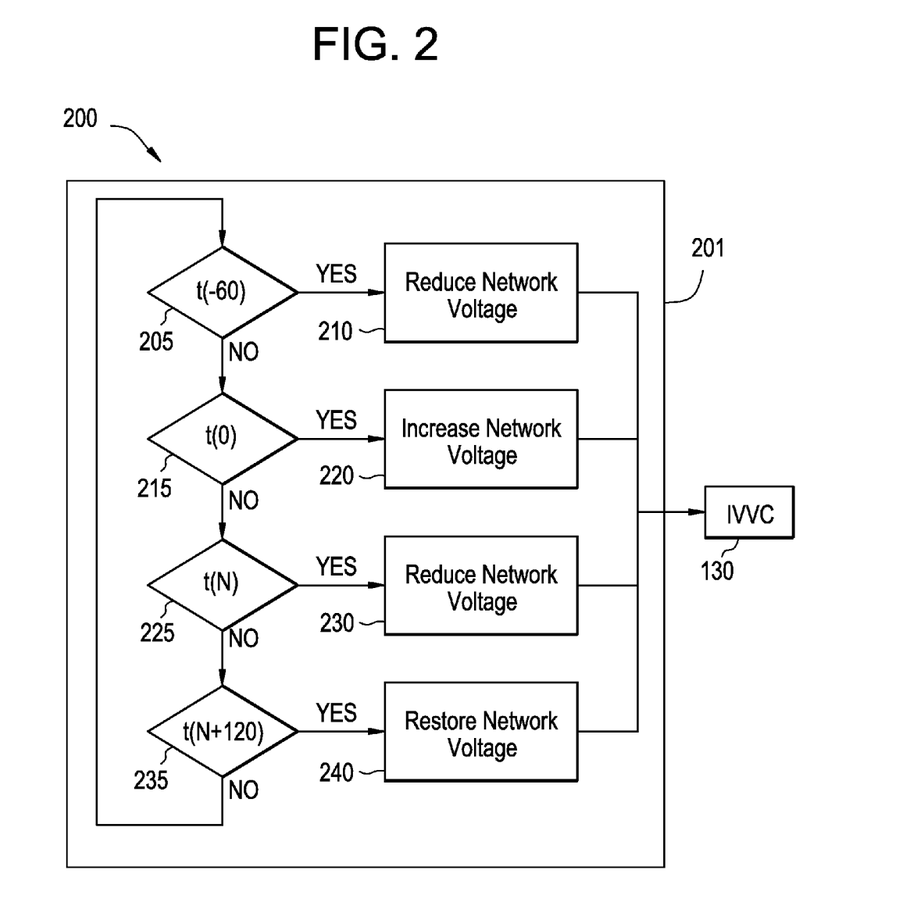
FIG. 2 illustrates a flowchart of a demand/response event dispatch loop method in accordance with exemplary embodiments.
Figure 3:
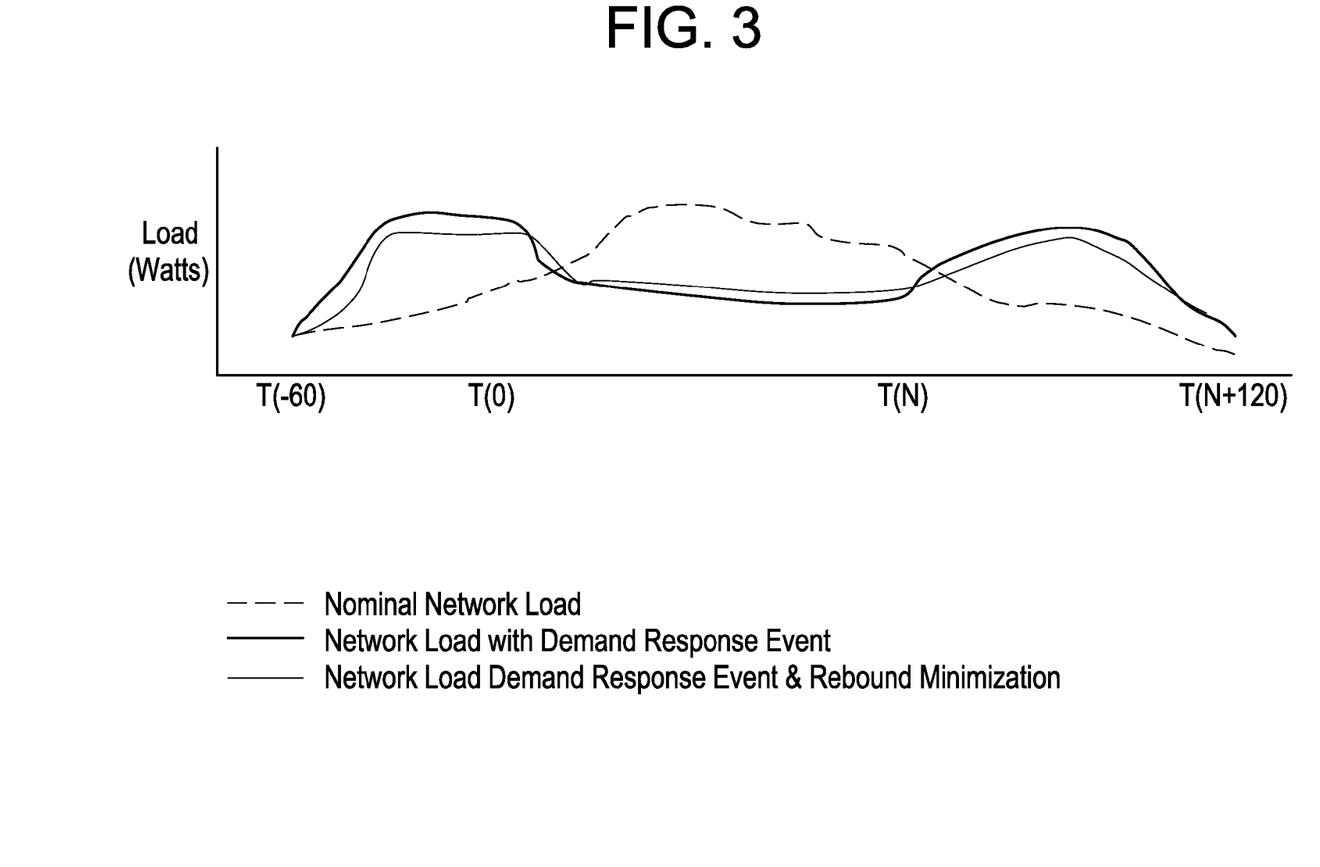
FIG. 3 illustrates a plot of load versus time.

As described herein, the IVVC can include algorithms to manage demand/response events. The algorithms in the IVVC can be coupled with other algorithms or can be spread across the system 100 in multiple parts. For example, the DRMS 110 can include a demand/response dispatch loop that provides instructions to the DMS 120 on how to distribute power during the demand response events. As described herein, one of the instructions can be how to reduce peaks of the pre-rebound effects of the demand/response event and increase the troughs of the post-rebound effects of the demand response event. FIG. 2 illustrates a flowchart of a demand/response event dispatch loop method 200 in accordance with exemplary embodiments. The demand/response event dispatch loop method 200 can be part of a DRMS demand event dispatcher application 201 that communicates with the IVVC 130, where the IVVC 130 resides in the DMS 120. In exemplary embodiments, the application 201 can be triggered as a scheduled event corresponding to a demand/response event as described herein. When triggered, the DRMS 110 can initiate the method 200 as now described. A series of time frames t(−60), t(0), t(N) and t(N+120) can be defined, for example. The variable, t, can represent the start of the demand/response event. Time, −60 corresponds to the initiation of the pre-rebound event. The time, N is the event duration, the time 0 represents the beginning of the post-rebound trough, and the time N+120 is the end of the post-rebound event. The time, N, as well as the determination of the pre-rebound event at −60 and the post-rebound event at N+120 are just examples. It will be appreciated that the values of the times can be determined from historical data based on when demand response events actually occur. FIG. 3 illustrates a plot 300 of load versus time. On the plot, a load axis generally refers to watts, with no magnitude shown for illustrative purposes. A time axis can be arbitrary time units. The plot 300 is illustrated in conjunction with the method 200 of FIG. 2. The plot 300 includes a nominal network load curve 305, which illustrates a peak 306 in load under nominal conditions in the power distribution network. The plot 300 also includes a network load curve 310 that occurs with a demand response event. As described herein, a pre-rebound peak 311 can occur at the beginning of the demand response event. In addition, a post rebound trough 312 can occur during the demand/response event, and an additional peak 313 can occur toward the end of the demand/response event when nominal network conditions resume. The plot 300 also includes a network load curve 315 that occurs with a demand/response event and is modified with rebound reduction in accordance with exemplary embodiments. As described herein, the exemplary systems and methods reduce the "Δ" of the peaks and troughs of the demand/response event. In accordance with exemplary embodiments, the network load curve 315 includes a pre-rebound peak 316 that has been reduced by a value of $\Delta_1$, and a post-rebound trough 317 with trough 317 increased by an amount $\Delta_2$. When the nominal conditions resume, the additional peak 318 is decreased by an amount $\Delta_3$. As described herein, by reducing the pre-rebound and post-rebound effects, the transition between the time periods has a decreased load swing.

The method 200 of FIG. 2 is now described in conjunction with FIG. 3. At block 205, the pre-rebound event as described herein initiates at t(−60). At block 210, the DRMS 110 reduces the overall network voltage by a pre-determined amount, resulting in the overall load decrease $\Delta_1$. The peak 316 therefore results rather than the peak 311. At block 215, at t(0), the post-rebound trough initiates. At block 220, the DRMS 110 increases the network voltage resulting in an overall load increase of $\Delta_2$. The trough 317 results rather than the trough 312. In this way, the overall swing between the peak 316 and the trough 317 is reduced compared to the swing between the peak 311 and the trough 312. At block 225, an additional post-rebound peak commences, which corresponds to the full duration, N, of the demand/response event. At block 230, the DRMS 110 reduces the network voltage, resulting in an overall decrease of the network load by $\Delta_3$. The peak 318 results rather than the peak 318. In this way, the overall swing between the trough 317 and the peak 318 is reduced compared to the swing between the trough 312 and the peak 313. In exemplary embodiments, at a predetermined amount of time beyond the event duration, N, which is in this case the arbitrary unit amount 120, the DRMS 110 will resume voltage network that was supplied before the demand/response event. As such, at block 235, the demand/response event passes at a time t(N+120) and at block 240, the DRMS 110 restores pre-demand response event voltage. The method 200 in the DRMS demand event dispatcher application 201 can be a loop that runs continuously and is timed to initiate for predetermined demand/response events.

Figure 4:
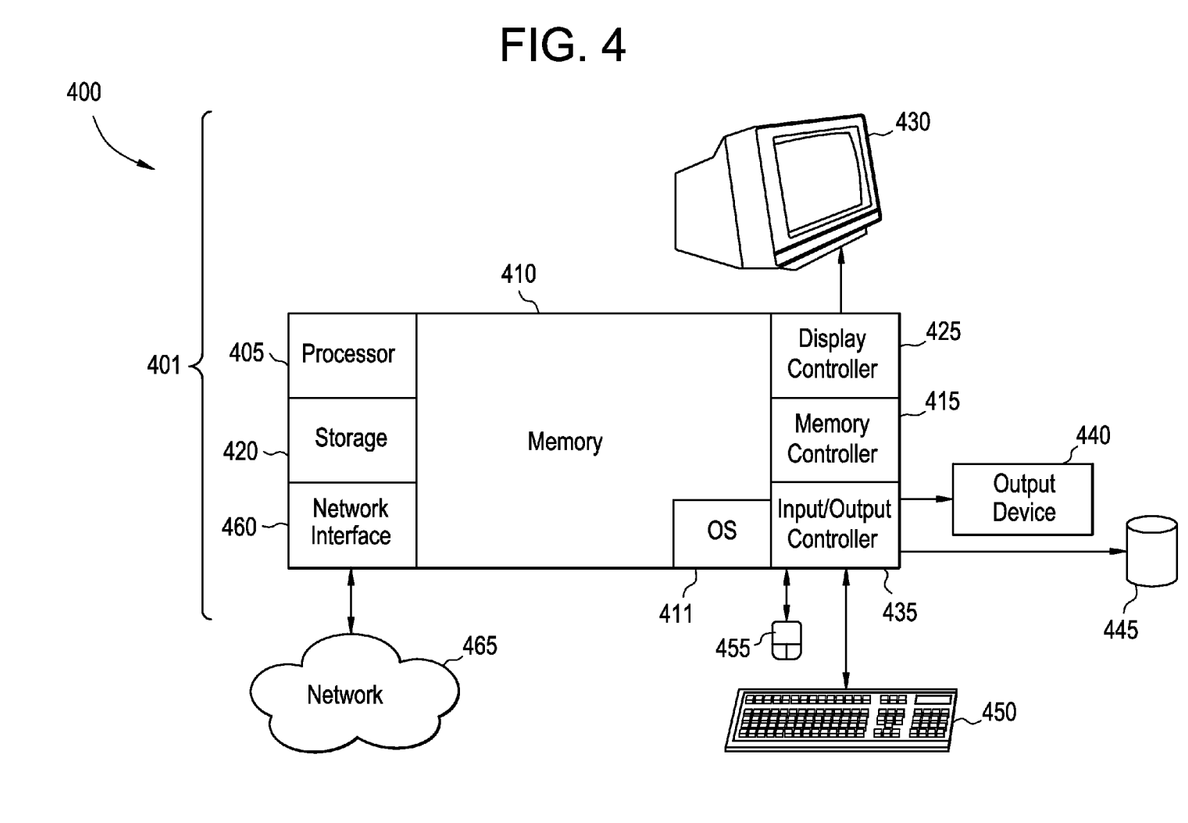
FIG. 4 illustrates an exemplary embodiment of a computing system for providing volt/VAR control.

The systems and methods described herein can be implemented by any suitable computing system. For example, the DMS 120 can include a computing system on which the IVVC 130 resides, and on which the DRMS demand event dispatcher application 201 resides. FIG. 4 illustrates an exemplary embodiment of a computing system 400 for providing volt/VAR control. The methods described herein can be implemented in software (e.g., firmware), hardware, or a combination thereof. In exemplary embodiments, the methods described herein are implemented in software, as an executable program, and are executed by a special or general-purpose digital computer, such as a personal computer, workstation, minicomputer, or mainframe computer. The system 400 therefore includes general-purpose computer 401.

In exemplary embodiments, in terms of hardware architecture, as shown in FIG. 4, the computer 401 includes a processor 405, a memory 410 coupled to a memory controller 415, and one or more input and/or output (I/O) devices 440, 445 (or peripherals) that are communicatively coupled via a local input/output controller 435. The input/output controller 435 can be, but is not limited to, one or more buses or other wired or wireless connections, as are known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The software in the memory 410 may include one or more separate programs, each of which comprises an ordered listing of executable instructions for implementing logical functions. In the example of FIG. 4, the software in the memory 410 includes the volt/VAR control methods described herein in accordance with exemplary embodiments and a suitable operating system (OS) 411. The OS 411 essentially controls the execution of other computer programs, such the volt/VAR control systems and methods as described herein, and provides scheduling, input-output control, file and data management, memory management, and communication control and related services.

The volt/VAR control methods described herein may be in the form of a source program, executable program (object code), script, or any other entity comprising a set of instructions to be performed. When a source program, the program needs to be translated via a compiler, assembler, interpreter, or the like, which may or may not be included within the memory 410, so as to operate properly in connection with the OS 411. Furthermore, the volt/VAR control methods can be written as an object oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 440, 445 may include input devices including for example, but not limited to, a printer, a scanner, a microphone, and the like. Finally, the I/O devices 440, 445 may further include devices that communicate both inputs and outputs including for instance, but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In exemplary embodiments, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In exemplary embodiments, the network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN), a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software stored within the memory 410, to communicate data to and from the memory 410, and to generally control operations of the computer 401 pursuant to the software. The volt/VAR control methods described herein and the OS 411, in whole or in part, but typically the latter, are read by the processor 405, perhaps buffered within the processor 405, and then executed.

When the systems and methods described herein are implemented in software, as is shown in FIG. 4, the methods can be stored on any computer readable medium, such as storage 420, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the volt/VAR control methods are implemented in hardware, the volt/VAR control methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include but are not limited to increased control over demand/response events. The exemplary systems and methods described herein combine demand response events with distribution management systems. As such, there is a reduction of the magnitude of the pre and post-load rebound effects caused by demand/response events. The voltage profiles of the all elements of the power distribution network are lowered prior to a demand/response event, which begins to reduce the overall load of the pre-rebound. The voltage of the overall power distribution network is raised to the maximum threshold during the start of the demand/response event to increase the load when the event starts. The voltage is reduced to normal levels during the demand event. At a predetermined time before the demand event ends, the voltage is raised again to increase the load. Once the demand event is over, voltage is lowered to reduce the load during the post-rebound.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for reducing effects of a demand/response event in a power distribution network, the method comprising:
    identifying a load profile in the power distribution network;
    in response to detecting a peak in the load profile, decreasing voltage in the power distribution network;
    in response to detecting a trough in the load profile, increasing the voltage in the power distribution network; and
    performing power cycling of a capacitor bank of the power distribution network by controlling a coordinated power cycling of inductive appliances to accomplish the decreasing of the voltage in response to detecting the peak, and the increasing of the voltage in response to detecting the trough, wherein the coordinated power cycling of inductive appliances comprises:
        estimating a voltage-ampere-reactive (VAR) power generated by each inductive appliance over a predetermined period of time when each inductive appliance is power cycled, wherein the predetermined period of time is determined from historical data associated with a previous occurrence of the demand/response event;
        scheduling power cycling for each appliance based at least in part on the estimated VAR power generated by each inductive appliance; and
        based on the scheduling, selectively providing VAR support by power cycling each inductive appliance to regulate the voltage in the power distribution network.

2. The method as claimed in claim 1 wherein the peak is a voltage peak prior to the demand/response event.

3. The method as claimed in claim 1 wherein the peak is a voltage peak after the demand/response event.

4. The method as claimed in claim 1 wherein the trough is a voltage trough after the demand/response event.

5. The method as claimed in claim 1 wherein a decrease of voltage in response to the detection of the peak and the increase of voltage in response to the detection of the trough reduces an overall load of the demand/response event.

6. The method as claimed in claim 1 wherein a decrease of voltage in response to the detection of the peak and the increase of voltage in response to the detection of the trough reduces a magnitude of a swing between the peak and the trough during the demand/response event.

7. The method as claimed in claim 1 further comprising returning the voltage level in the power distribution network to a pre-demand/response event level.

8. The method as claimed in claim 1 wherein the load profile corresponds to the demand/response event.

9. The method as claimed in claim 8 wherein the load profile includes a pre-rebound effect.

10. The method as claimed in claim 9 wherein the load profile includes a post-rebound effect.

11. A computer program product for reducing effects of a demand/response event in a power distribution network, the computer program product including a non-transitory computer readable medium having instructions for causing a computer to implement a method, the method comprising:
    identifying a load profile in the power distribution network;
    in response to detecting a peak in the load profile, decreasing voltage in the power distribution network;
    in response to detecting a trough in the load profile, increasing the voltage in the power distribution network; and
    performing power cycling of a capacitor bank of the power distribution network by controlling a coordinated power cycling of inductive appliances to accomplish the decreasing of the voltage, in response to detecting the peak, and the increasing of the voltage, in response to detecting the trough, wherein the coordinated power cycling of inductive appliances comprises:
        estimating a voltage-ampere-reactive (VAR) power generated by each inductive appliance over a predetermined period of time when each inductive appliance is power cycled, wherein the predetermined period of time is determined from historical data associated with a previous occurrence of the demand/response event;
        scheduling power cycling for each appliance based at least in part on the estimated VAR power generated by each inductive appliance; and
        based on the scheduling, selectively providing VAR support by power cycling each inductive appliance to regulate the voltage in the power distribution network.

12. The computer program product as claimed in claim 11 wherein the peak is a voltage peak prior to the demand/response event.

13. The computer program product as claimed in claim 11 wherein the peak is a voltage peak after the demand/response event.

14. The computer program product as claimed in claim 11 wherein the trough is a voltage trough after the demand/response event.

15. The computer program product as claimed in claim 11 wherein a decrease of voltage in response to the detection of the peak and the increase of voltage in response to the detection of the trough reduces an overall load of the demand/response event.

16. The computer program product as claimed in claim 11 wherein a decrease of voltage in response to the detection of the peak and the increase of voltage in response to the detection of the trough reduces a magnitude of a swing between the peak and the trough during the demand/response event.

17. The computer program product as claimed in claim 11 wherein the method further comprises returning the voltage level in the power distribution network to a pre-demand/response event level.

18. The computer program product as claimed in claim 11 wherein the load profile corresponds to the demand/response event and includes a pre-rebound effect and a post-rebound effect.

* * * * *